3,463,387
OIL CIRCULATION IN ROTARY
PISTON VACUUM PUMP
Hansen Pfaff and Hartmut Sinn, Hanau am Main, and
Maximilian Wutz, Grosskrotzenburg, Germany, assignors, by mesne assignments, to Leybold-Heraeus-Verwaltung GmbH, Cologne Bayenthal, Germany
Filed Oct. 6, 1967, Ser. No. 673,336
Claims priority, application Germany, Oct. 29, 1966,
H 60,894
Int. Cl. F04c 29/02; F04d 29/06
U.S. Cl. 230—207     3 Claims

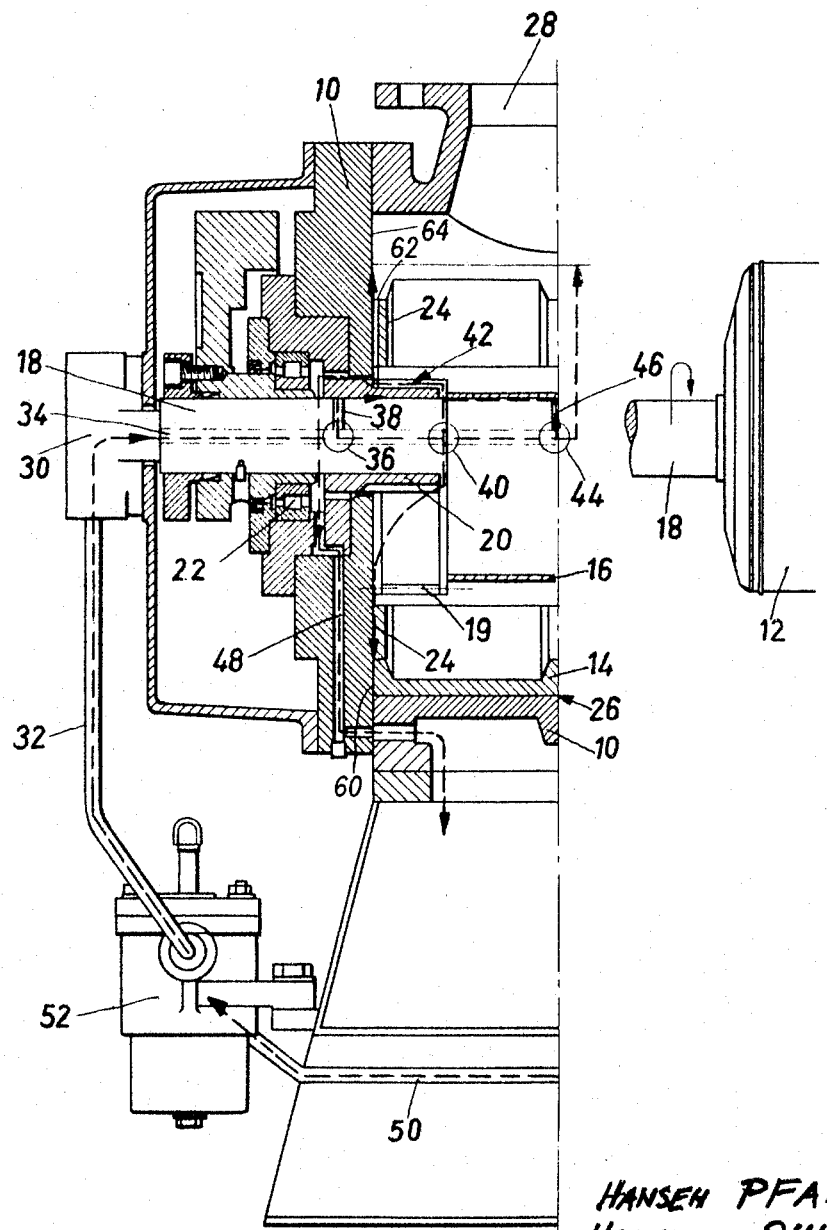
HANSEN PFAFF,
HARTMUT SINN, &
MAXIMILIAN WUTZ,
Inventors.

ABSTRACT OF THE DISCLOSURE

A lubricating and sealing fluid circuit comprises at least one duct in the rotary piston and a third guide channel in each end surface of the piston.

---

The present invention concerns a rotary piston vaccum pump having an eccentrically operating hypotrochoidal form piston rotating within a housing forming a mantle therefor.

It has been found that among the various forms of construction of such a machine, those having a transmission ratio of 1:2 or 2:3 are particularly useful as vacuum pumps. The exhaust chamber is separated from the compression chamber by the piston at the circumferential surface of the latter and at the end faces of the piston between the movable and the fixed portions of the pump.

A vacuum pump is distinguished from other pumps particularly by the large pressure differential between the exhaust chamber and the compression chamber. In order to maintain the pressure differential, a very high degree of sealing along the end faces of the piston and the circumferential faces of the piston are necessary in order to separate the suction and the pressure sides.

The solution of this problem is made difficult because the end faces of the piston have to carry out, with respect to the housing, an eccentric sliding motion as the area of contact of the end faces of the piston with respect to the housing constantly changes as the piston rotates. Further the piston has an end face formed with internal gearing matching a pinion fixed to the housing, to form a pair of relatively rolling surfaces. The movable parts must be lubricated; yet no leakage losses may occur on those parts in which there is a sliding motion in the different regions of the suction and pressure sides of the pump.

When sealing is insufficient then, particularly at the end faces of the piston, the danger occurs that gas is carried from the compression chamber into the suction chamber. The gear pairs, which carry out the synchronization of the piston are very much subject to dirt which may be contained in any dusty gases being sucked out. Further, the eccentric drive of the rotational piston must remain free of any dirt. If dirt gets in, then the gears rapidly wear and the very exact drive of the piston, as is necessary for a rotational piston pump, is quickly deleteriously affected.

Pumps having an oil sealing, and having a rotary piston, are known; the problems faced by a hypotrochoidal form piston, driven eccentrically, have, however, not been solved. In vacuum pumps of this type, the sealing oil is collected in the pressure side of the pump and simply added into the pumping space.

In order to avoid these disadvantages, oil ducts and an oil circuit are provided at the piston faces and within the piston itself.

In contrast to known devices in and in accordance with the present invention, the oil stream is precisely guided and is aimed at those parts which must be sealed. The advantage is in a small use of oil and a very small oil fuming and fogging.

Before the oil is placed into the actual pumping chamber, it can be used as a lubricant. To carry this out, the oil is centrally supplied to the piston, over channels, which first supply the lubricating points such as gear drive guides, the eccentric drives and is then applied to the sealing surfaces. Shallow radial oil guiding tracks or grooves are milled in the end faces of the piston. Thus the piston side surfaces have sealing oil applied thereto constantly.

The structure, organization, and operation of the invention will now be described more specifically with reference to the accompanying drawing, wherein: the single figure is a section of a vacuum pump constructed in accordance with the invention and shows only the parts thereof which are relevant with respect to the novelty thereof. Only one half of the pump is illustrated as the other is symmetrical with respect to the chain-dotted central line.

A pump is mounted in a housing 10 and driven from a motor 12 by means of a shaft 18. A hypotrochoidal form piston 14 which, in case of a transmission ratio of 1:2, is elliptical, is connected so as to be driven by an eccentric 16 fixed to the motor shaft 18. The piston 14 has an internal gearing 19, which meshes with a pinion 20 fixed to the housing 10. The rotatable shaft 18 passes freely through the pinion 20 and is held in a bearing 22 in the housing 10.

Axial openings in the hollow piston 14 are closed off by well fitting end covers 24. The closed end surfaces of the piston 14 carry out, with respect to the internal faces 64 of the housing 10 a rotary and rocking or tumbling motion with respect to the housing. At these points at which the piston is always in contact with the housing, as at the circumferential surfaces at which the rotary piston 14 contacts the housing 10 forming the mantle, for example on line 26, the suction and the pressure chambers must be precisely and well separated from each other. A pressure port 28, connected to a pressure chamber, is illustrated at the upper end of the drawing.

The pump is both sealed and lubricated with oil. A pump 30 is supplied for oil circulation. It should be noted, however, that such a pump is not necessary as the circulation can also be obtained by the great pressure differential within the vacuum pump itself. Oil is sucked in the direction of the arrows through a line 32 and enters through an axial central line 34 into the movable parts. At a first junction point 36 oil passes through a bore 38 to lubricate the bearing surface between the shaft 18 and the fixed pinion 20. At a second junction 40, oil is applied radially to the end face of the pinion 20 where it seals off as well as lubricates, the movable parts of the piston 14. Furthermore, oil is forced to the edge surfaces of teeth 42 of the pinion 20 and on to the gearing 19 which form the rolling drive guide, to lubricate these parts.

The oil finally passes into the region of the covers 24 where it serves more for sealing than for lubricating, but also to some extent for lubricating. From a central branch 44 on the piston 14, the oil finally reaches, through channels such as ducts 46, the eccentric sliding track and is carried to the circumferential surface of the piston so that, even at those parts of the pump, sealing and lubricating is assured at all times. The ducts used to guide the oil are provided in the body of the piston or milled into the end faces 60 of the piston 14 as seen at 62. The shallow and radially directed oil ducts at the end faces of the piston form a particularly good sealing at the side of the rotating piston.

The excessive oil, or that which is taken out in the pressure part of the chamber, is collected through a channel 48 to an oil sump (not shown) where it is re-applied through a suction line 50 and 52 into the oil circuit under pressure, or by means of the pressure differential within the vacuum pump itself.

Oil is thus guided in the interior of the rotary piston vacuum pump by means of ducts formed therein at exactly those points at which it is needed simultaneously for sealing, for further lubrication, and to maintain the extremely high pressure differential in the pump. For lubrication, it lubricates the movable parts, particularly the bearings and the end faces.

Further features of a pump in accordance with the present invention are shown and described in detail in the copending application by the inventor herein filed at the same date Oct. 6, 1967 and entitled: Oil Sealing of Rotary Piston Vacuum Pump, S.N. 673,359; Transmission Drive For Rotary Piston Vacuum Pump, S.N. 673,427; and End Face Sealing in Rotary Piston Vacuum Pump, S.N. 673,337.

We claim:

1. In a rotary piston vacuum pump having a housing (10) and an eccentrically rotatable hypotrochoidal piston (14) having end faces (60) rotatable in said housing, said housing having the form of an enveloping figure and having a contact line (26) at which the piston contacts the housing to separate the pressure and suction chambers of the pump and inner walls (64) adjacent said end faces (60), drive means including a drive shaft (18) engaging said piston, and means (32) supplying oil under pressure to said piston, including ducts (34, 36, 38, 40, 46) formed in said shaft, the improvement comprising
   oil ducts (62) formed on the end faces (60) of said piston (10) and located to be in fluid communication with said ducts in said shaft and extending to the end of said faces supplying oil between said end faces (60) and said inner walls (64) and to the pressure chamber of said pump sealing said contact line (26);
   and collection ducts (48) connecting to an oil sump and in fluid communication with said oil ducts (62).

2. Pump according to claim 1 wherein said oil ducts (62) formed in the end faces of the piston extend radially outwardly from said drive shaft.

3. Pump according to claim 1 wherein said oil ducts (62) are milled into said end faces of said piston.

References Cited

UNITED STATES PATENTS

| | | | |
|---|---|---|---|
| 1,451,859 | 4/1923 | Balcker | 230—207 XR |
| 2,737,341 | 3/1956 | Bitzer | 230—205 XR |
| 3,180,563 | 4/1965 | Jones et al. | 230—145 |
| 3,280,812 | 10/1966 | Peras | 230—207 XR |

ROBERT M. WALKER, Primary Examiner